United States Patent Office 2,748,157
Patented May 29, 1956

2,748,157

REGENERATION OF COPPER CHLORIDE CATALYSTS EMPLOYED IN THE PRODUCTION OF ACRYLONITRILE

Keith M. Taylor, La Marque, Tex., assignor to Monsanto Chemical Company, St. Louis, Mo., a corporation of Delaware No Drawing. Application March 26, 1953,
Serial No. 344,887

6 Claims. (Cl. 260—465.3)

The present invention relates to production of acrylonitrile and more particularly it relates to a method for regenerating the copper chloride catalysts employed for the production of acrylonitrile from acetylene and hydrogen cyanide.

The production of acrylonitrile by the catalytic reaction of acetylene and HCN in the presence of copper catalysts is described in the U. S. Reissue Patent 23,265, issued to Kurtz. The fresh catalytic solution employed in such a process comprises essentially an aqueous solution of cuprous chloride, together with sodium and potassium chlorides and hydrogen chloride. After the reaction proceeds for some length of time, the catalyst, because of undesirable side reactions, becomes "poisoned" and a significant decrease in the rate of production of acrylonitrile occurs. The system is a complex one and there are a number of factors which contribute to the loss of activity or poisoning of the catalyst among which is the formation of so-called net soluble carbon in the catalyst. Net soluble carbon is determined by a total carbon analysis on the liquid catalyst from which the contribution due to soluble cyanide is deducted. Means for internal treatment of the catalyst so that the desired level of certain of the by-products which affect catalyst life is maintained have been developed and are generally employed in commercial processes. In the prior art, however, little attention has been devoted to suitable methods for restoring the activity of the copper chloride catalyst by other than control of conditions, such as adjusting the acetylene to HCN ratio, controlling the pH of the catalyst, etc.

Studies of the catalyst system have shown that if there is a controlling component to which catalyst life can be related, net soluble carbon is probably that component. From these studies it also appears improbable that the formation of net soluble carbon can be suppressed to any major extent by a choice of one or more favorable conditions. Internal treatment of the catalyst, therefore, cannot be employed without disrupting some other phase of the overall mechanism of the reaction. Continuous and complete regeneration of a part of the catalyst, therefore, is the only means for maintaining some economical level of activity. The regenerated material may then be employed in replacing the material withdrawn for treatment. As little as possible of the impurities affecting catalyst life should be tolerated in the regenerated material and the copper to carbon ratio (Cu/C) must be maintained at the highest possible level.

It is an object of the invention, therefore, to provide an improvement in the process for preparing acrylonitrile from acetylene and hydrogen cyanide using copper chloride catalysts.

It is a further object of the invention to provide a process for the generation of the copper chloride catalyst used in the production of acrylonitrile from acetylene and HCN which is both practical and economical.

It has now been discovered that the net soluble carbon content of regenerated catalyst can be significantly decreased and the copper to carbon ratio of such regenerated catalyst can be significantly increased by washing the copper chloride which can be precipitated from "used" catalyst by water dilution with acetonitrile. According to the invention, catalyst is withdrawn from the reaction zone, diluted with water, filtered to recover the copper chloride as a precipitate, and this precipitate is washed with acetonitrile to free it from soluble carbon and render it re-useable. Catalyst regenerated in this fashion has an efficiency comparable to the original catalyst employed in the system.

The efficiency of the copper chloride catalyst expressed as grams of acrylonitrile produced per liter of catalyst per hour has been shown to be a function of its net soluble carbon content. The following data demonstrate that those catalysts having the higher copper to soluble carbon ratios approach more closely to the efficiency of the fresh catalyst than those with a lower copper to net soluble carbon ratio.

*Effect of Cu/C weight ratio on catalyst activity*

| Catalyst | Cu/C Ratio | Activity, g./hr./li. |
|---|---|---|
| Fresh | >170 | 10.9 |
| Used | 4.68 | 6.6 |
| Regenerated by water dilution only | 10.65 | 8.7 |

The following examples will serve to illustrate the invention but are not to be construed as limiting it in any fashion.

*Example 1*

A 100-g. sample of "used" catalyst having the following analysis:

| | Per cent |
|---|---|
| Cu | 24.8 |
| CN | 1.08 |
| Net soluble carbon | 3.48 | was diluted with 10 volumes of distilled water at a temperature of 40° C. The mixture was stirred thoroughly for 3–5 minutes and then filtered through a Buchner funnel. The copper chloride precipitate obtained was washed several times with acetonitrile, filtered again, and dried.

The dried precipitate was analyzed for carbon, copper, and cyanide content. Carbon was determined by means of a carbon-hydrogen combustion train; copper was determined by electrolysis and cyanide was determined by distillation and titration with silver nitrate. The regenerated copper chloride thus produced contained 62% copper, 0.5% cyanide, and 2.7% net soluble carbon, and had a Cu/C ratio of 43.

*Example 2*

According to the procedure of Example 1, a number of samples of "used" catalyst were subjected to water dilution and filtered. The copper chloride precipitates resulting from the filtration of those solutions were washed a number of times with the following common solvents: benzene, methyl alcohol, carbon tetrachloride, ethyl ether, and cyclohexanol. After re-filtration and drying, the copper chloride filter cake was dried and analyzed as described in Example 1. The results of those analyses are tabulated below along with that obtained in Example 1 using acetonitrile for the solvent wash:

| Run | Solvent | Percent Cu | Percent CN | Percent C | Percent Cu/C |
|---|---|---|---|---|---|
| 1 | Benzene | 53.5 | 1.45 | 2.90 | 24 |
| 2 | Methyl alcohol | 59.0 | 2.2 | 3.19 | 27 |
| 3 | Carbon tetrachloride | 60.5 | 0.7 | 2.52 | 28 |
| 4 | Ethyl ether | 51.5 | 3.24 | 3.28 | 28.6 |
| 5 | Cyclohexanol | 57.5 | 0.5 | 2.24 | 28.7 |
| 6 | Acetonitrile | 62.0 | 0.5 | 1.6 | 43 |

Variations in the pH of the water used for dilution are not significant. The pH of the water may range from 1 to 10 without affecting the resulting copper chloride precipitate.

The temperature of the water used for dilution may be maintained between 0° and 70° C. but preferably water at 20–50° C. is employed.

The preferred quantity of water employed for dilution is 10 volumes of water per volume of catalyst. However, ratios of dilution water/used catalyst from 5:1 to 20:1 may be employed with equally effective results.

What is claimed is:

1. A process for the regeneration of aqueous acid cuprous chloride catalysts which comprises diluting said catalyst with water to precipitate cuprous chloride, filtering, and washing said cuprous chloride precipitate with acetonitrile.

2. A process for the regeneration of aqueous acid cuprous chloride catalysts which comprises diluting said catalyst with water, at a temperature from about 20° C. to about 50° C., to precipitate cuprous chloride, filtering, and washing said cuprous chloride precipitate with acetonitrile.

3. A process for the regeneration of aqueous acid cuprous chloride catalysts which comprises diluting said catalyst with from about 5 volumes of water to about 20 volumes of water per volume of catalyst at a temperature from about 0° to about 70° C. to precipitate cuprous chloride, filtering, and washing said cuprous chloride precipitate with acetonitrile.

4. In a process for the production of acrylonitrile by the reaction of acetylene and hydrocyanic acid in the presence of aqueous acid cuprous chloride catalysts, the improvement which comprises regenerating the copper chloride catalyst by diluting the catalyst with water to precipitate the cuprous chloride, filtering, and washing the cuprous chloride precipitate with acetonitrile.

5. In a process for the production of acrylonitrile by the reaction of acetylene and hydrocyanic acid in the presence of aqueous acid cuprous chloride catalysts, the improvement which comprises regenerating the copper chloride catalyst by diluting the catalyst with water at a temperature from about 20° C. to about 50° C., to precipitate the cuprous chloride, filtering, and washing the cuprous chloride precipitate with acetonitrile.

6. In a process for the production of acrylonitrile by the reaction of acetylene and hydrocyanic acid in the presence of aqueous acid cuprous chloride catalysts, the improvement which comprises regenerating the copper chloride catalyst by diluting said catalyst with from about 5 to about 20 volumes of water per volume of catalyst at a temperature from about 0° to about 70° C. to precipitate the cuprous chloride, filtering, and washing the cuprous chloride precipitate with acetonitrile.

References Cited in the file of this patent

UNITED STATES PATENTS

| | | |
|---|---|---|
| 1,915,152 | Calcott | June 20, 1933 |
| 2,323,631 | Stadler | July 6, 1943 |
| 2,464,723 | Schulze et al. | Mar. 15, 1949 |
| 2,649,418 | Stehman | Aug. 18, 1953 |

OTHER REFERENCES

Mellor: "Comprehensive Treatise on Inorganic and Theoretical Chemistry," vol. 3, pgs. 160, 162; Longmans, Green & Co., New York, 1923.